United States Patent [19]

Erickson

[11] 4,333,785

[45] Jun. 8, 1982

[54] ADHESION OF BRASS TO RUBBER

[75] Inventor: David E. Erickson, Stow, Ohio

[73] Assignee: The General Tire & Rubber Company, Akron, Ohio

[21] Appl. No.: 254,572

[22] Filed: Apr. 15, 1981

Related U.S. Application Data

[63] Continuation of Ser. No. 150,103, May 15, 1980, abandoned.

[51] Int. Cl.$^3$ .................. B32B 31/00; B32B 31/26
[52] U.S. Cl. ........................ 156/281; 134/3;
134/28; 134/41; 152/359; 156/110 C;
156/307.5; 156/307.7; 156/316; 156/629;
252/79.1; 252/142; 427/309; 427/327; 427/405;
428/381; 428/625
[58] Field of Search .............. 156/281, 110 C, 316,
156/307.5, 629, 307.7; 152/359; 427/309, 405,
327; 428/381, 625; 252/142, 79.1; 134/3, 41, 28

[56] References Cited

U.S. PATENT DOCUMENTS

| 259,721 | 6/1882 | Richardson | 156/316 |
| 2,240,862 | 5/1941 | Schade | 156/307.5 |
| 2,318,559 | 5/1943 | Percival | 134/3 |
| 2,382,865 | 8/1945 | Dittmar | 252/79.1 |
| 2,563,113 | 8/1951 | Hindin et al. | 156/281 |
| 3,853,618 | 12/1974 | Smith | 134/3 |
| 4,299,640 | 11/1981 | Erickson | 156/307.5 |
| 4,304,113 | 12/1981 | Takei et al. | 72/39 |

Primary Examiner—John J. Gallagher

[57] ABSTRACT

At least a substantial amount of the corrosion products on the surface(s) of brass plated steel cord are removed by treatment in an aqueous solution containing a minor amount of an $NH_4$, Na, K, Li, Ca, Mg, Sr, Ba and Zn salt of a saturated aliphatic carboxylic acid of from 1 to 5 carbon atoms.

8 Claims, No Drawings

ADHESION OF BRASS TO RUBBER

This is a continuation of application Ser. No. 150,103, filed May 15, 1980, now abandoned.

This invention relates to the adhesion of brass to rubber, and more particularly, it relates to the adhesion of brass-plated steel tire cord (wire) to rubber.

BACKGROUND OF THE INVENTION

The bond between brass and rubber is believed to involve the formation of a thin layer of cuprous sulfide. During compounding and fabrication of the tire, the rubber picks up a small amount of water. Moreover, the presence of a layer of zinc hydroxide and/or oxide on the surface of the brass before use or the formation of zinc hydroxide and/or oxide by water in the rubber reacting with metallic zinc, leads to the very rapid growth of the cuprous sulfide layer and/or the formation of more zinc oxide and/or hydroxide. Some cuprous oxide, also, may be in these outer layers of the brass coating. These reactions are accelerated by the heat developed during operation of the tire. Thus, there is formed a relatively thick friable or weak layer of corrosion products where debonding can occur in said layer or between said layer and the brass and/or rubber strata.

Accordingly, it is an object of the present invention to overcome the difficulties alluded to above and to provide a method of treating brass to improve its adhesion to rubber.

Another object is to provide a brass-rubber composite exhibiting an improved brass-rubber bond.

Yet another object is to increase the resistance of the rubber-brass bond to degradation caused by heat and the presence of moisture.

A further object of this invention is to provide brass with a surface which is more amenable to bonding to rubber.

These and other objects and advantages of the present invention will become more apparent to those skilled in the art from the following detailed description and working examples.

SUMMARY OF THE INVENTION

According to the present invention it has been found that the corrosion products on brass-plated steel cord can readily be removed by treatment with a dilute aqueous solution of a salt of a lower saturated aliphatic carboxylic acid. After dipping in the solution, washing and drying, the treated cord can be combined with a curable rubber compound and cured. Adhesion tests on the treated cords show improvements in the unaged and humid aged strengths of the brass-plated steel cord to rubber.

It is believed that the improved results in adhesion are obtained because the present surface treatment removes an outer surface layer(s) of oxides and hydroxides especially of zinc and increases the ratio of copper to zinc in the outer surface layer(s) of the brass plating on the steel cords. Some copper oxide, also, may be removed by the treatment.

Discussion of Details and Preferred Embodiments

Brass plated steel tire cords (wire), are well known for use in the belts and carcasses of passenger, truck and off-the-road tires and for other purposes like belts. The wire may be woven or non-woven filaments of steel, and the wire or cords when used in tires is usually called a fabric. The steel may be dipped, electroplated or otherwise coated with the brass as is well known. The brass plating should be complete although some iron may be exposed on commercially brass plated steel cords. Usually the brass is deposited as a thin coating on the steel, usually not over about 1.2% by weight of the steel. The brass may contain from about 60 to 95% by weight of copper, preferably from about 62 to 72% by weight of copper, and even more preferably in the upper portion of this range to obtain higher adhesion, the balance being essentially zinc except for very minor amounts of other elements or compounds as adventitious or alloying materials. For more information on brass please see "Encyclopedia Of Chemical Technology," Kirk-Othmer, 2nd Ed., Vol. 6, pages 183 to 265, 1965, Interscience Publishers, a division of John Wiley & Sons, Inc., New York.

The dip or wash solution to remove the corrosion products on the surface of the brass-plated cord is a dilute solution of certain salts of saturated aliphatic carboxylic acids having from one to five carbon atoms such as formic acid, acetic acid, propionic acid, n-butyric acid, isobutyric acid, valeric acid, isovaleric acid and so forth and mixture thereof. The cation of the salt is selected from the group consisting of ammonia (ammonium), sodium, potassium, lithium, calcium, magnesium strontium, barium and zinc and mixture thereof. Examples of such salts are ammonium formate, ammonium acetate, ammonium propionate, ammonium n-valerate, sodium formate, sodium acetate, sodium propionate, sodium n-valerate, potassium formate, potassium acetate, potassium propionate, potassium n-butyrate, lithium formate, lithium acetate, lithium isovalerate, calcium formate, calcium acetate, calcium propionate, calcium n-butyrate, calcium isobutyrate, calcium isovalerate, magnesium formate, magnesium acetate, magnesium propionate, magnesium n-butyrate, magnesium n-valerate, strontium formate, strontium acetate, barium formate, barium acetate, barium propionate, barium n-butyrate, zinc formate, zinc acetate, zinc propionate, zinc n-butyrate and zinc n-valerate and mixtures of the same.

The salt is dissolved in the water in a concentration of from about 0.5 to 6.0 percent by weight.

The pH of the aqueous dip can be controlled by adding one or more of the above corresponding free acids such as acetic acid, propionic acid and the like and mixture thereof or by adding the corresponding free base like ammonia (or ammonium hydroxide), sodium hydroxide, potassium hydroxide and the like and mixture thereof. While the pH can be slightly on the acidic side or on the basic side, it is preferred that the pH of the solution be on the basic side and even more preferably be from about 7 to 10.

The brass plated steel cords are dipped in the aqueous solution for a time sufficient to remove all or at least a substantial amount of the corrosion products on the surface of or in the outer surface layers of the brass to improve the adhesion of the brass to rubber. The time of immersion may vary from about 125 to 100 seconds depending on the temperature, preferably at room temperature (about 25 degrees C.) to avoid loss of water although temperatures somewhat above room temperature may be used. After dipping the treated cords are preferably then dipped in water or rinsed with water to remove the residue of the salt solution on the cord. Next the cord is dried in air or inert (non reactive) gas at elevated temperatures to evaporate the water. Times and temperatures for drying may vary, but they can be in the range of from about 125 to 225 degrees C. for from about 60 to 120 seconds. The times and temperatures of drying should be sufficient to dry the cord without developing oxides of copper and zinc on the surface of the brass. After drying the cord can be combined (calendered, coated, laminated and so forth) with a curable rubber compound and cured (vulcanized). Alternatively, the cord may be stored such as in the inert or dry atmosphere until needed for use. In some instances the treated cord after storage under dry conditions for 6 weeks, still exhibits improved results. However, extended humid aging results in a steady decrease in adhesion.

The rubber to which the cord is to be bonded is preferably natural rubber or polyisoprene. However, blends thereof with other rubbery polymers like rubbery butadiene-styrene copolymers and/or polybutadiene can be used. For products other than tires there can be used nitrile rubber, polychloroprene and so forth. These rubbers can be suitably compounded with carbon black, silica (preferably dried), zinc oxide, stearic acid, antioxidants, accelerators, resins, sulfur and so forth.

Brass plated steel tire cords treated according to the present invention can be used in the belts and carcasses of passenger, truck and off-the-road tires, in belts and hose and for other purposes.

The following examples will serve to illustrate the present invention with more particularity to those skilled in the art.

EXAMPLE I

Brass coated steel tire cord (wire) was treated in a laboratory cord dipping unit at the rate of 10 feet per minute. The immersion time in the aqueous ammonium acetate bath or dip at room temperature (about 25 degrees C.) was 48 seconds. The dipped cord was then rinsed with flowing tap water for 40 seconds at room temperature and dried in a hot air oven for 110 seconds at 177 degrees C. The treated cord was then wound up on a metal spool (5 cm. diameter) and stored in a desiccator until made into adhesion samples.

The brass coated steel cord was American Enka Corporation Enka Type Z tire cord ($7 \times 4 \times 0.20$ mm + $1 \times 0.15$ mm brass-plated steel wire with $6 \pm 2$ g brass/kg wire and with $67.5 \pm 3.5\%$ by weight of copper in the brass).

The pH of the aqueous ammonium acetate solution was varied by the addition of small amounts of concentrated ammonia or of glacial acetic acid.

Research grade chemicals were used.

The spool was removed from the desiccator, and specimen cords were then cut and without a solvent wash were embedded in a rubber compound. The rubber compound was $\frac{5}{8}''$ thick and backed with metal strips to reduce rubber deformation. The single end pullout force was measured on an Instron tester at 5 inches per minute using a special slotted jig to hold the sample (Coates and Lauer, "Rubber Chemistry & Technology," 1972, Vol. 45, No. 1, page 16). Each sample contained 16 cords. Also, humid aged tests were carried out on the sample after every other wire had been pulled (in other words after half the wires were pulled, the sample was humidity aged and then the remaining wires were tested), or on alternative samples. In any event, the reported values for adhesion are the average of 16 pulls and are reported in Newtons (N). The samples of the rubber compounds containing the wire cords embedded therein were cured in a mold at 153 degrees C. for 35 minutes. For humidity aging the rubber samples containing the embedded cords were placed in aluminum cylinders containing 100 cc of liquid water at the bottom of the cylinder, purged with nitrogen 3 times and sealed. The samples were on a screen in the cylinder above the liquid water. The sealed cylinders containing the samples, water and nitrogen were then aged for 72 hours in a hot air oven at 121 degrees C. After this period of time, the samples were removed from the oven and from the cylinders and stored wet in bags until testing which was conducted (except as noted) within a few hours after removal from the oven.

Adhesion tests for the unaged and humid aged samples were conducted at room temperature (about 25 degrees C.).

The rubber compound used to make the samples comprised the following ingredients:

| Ingredient | Parts by Weight |
| --- | --- |
| Natural rubber | 100 |
| HAF carbon black | 30 |
| Silica ("Hi-Sil," precipitated, hydrated silica, PPG Industries, Inc.) | 15 |
| Zinc oxide | 10 |
| Stearic acid | 1.5 |
| N-(1,3-Dimethylbutyl)-N'-phenyl-p-phenylenediamine ("Santoflex" 13, Monsanto, Organic Division, Rubber Chemicals) | 2 |
| "Cohedur" RL, 1 to 1 parts by wt. mixture of resorcinol and "Cohedur" A, which is the pentamethyl ether of hexamethylol melamine, with a small amount of dibutyl phthalate plasticizer for viscosity control. Naftone, Inc. | 4.6 |
| N,N-dicyclohexyl-2-benzothiazyl sulfenamide ("Vulkacit" DZ, Mobay Chemical Co.) | 1.3 |
| Sulfur (Rubbermakers Grade) | 3.0 |

The results obtained on the adhesion tests are shown in Table I, below:

TABLE I

| Run No. | Treatment | pH |
| --- | --- | --- |
| 1 | 5% acetic acid/$H_2O$ | — |
| 2 | 1% $NH_4C_2H_3O_2$/$H_2O$ | 5.0 |
| 3 | 1% $NH_4C_2H_3O_2$/$H_2O$ | 6.0 |
| 4 | 1% $NH_4C_2H_3O_2$/$H_2O$ | 7.02 |
| 5 | 1% $NH_4C_2H_3O_2$/$H_2O$ | 8.0 |
| 6 | 1% $NH_4C_2H_3O_2$/$H_2O$ | 9.0 |
| 7 | 2% $NH_3$/$H_2O$ | 11.35 |
| 8 | Water rinse, hot air dry | — |
| 9 | Hot air | — |
| 10 | No treatment (control) | — |

| Run No. | Unaged Adhesion (N), (Coverage) | Humid Aged Adhesion (N), (Coverage) | % Adhesion Change |
| --- | --- | --- | --- |
| 1 | 500(5) | 322(0) | −36 |
| 2 | 801(7) | 675(4) | −16 |
| 3 | 749(6) | 790(7) | +6 |
| 4 | 904(8) | 803(8) | −11 |
| 5 | 931(9.5) | 806(7.5) | −13 |
| 6 | 925(9) | 825(7.5) | −11 |
| 7 | 893(9) | 711(6) | −20 |
| 8 | 835(9) | 560(4) | −33 |
| 9 | 851(8.5) | 583(4) | −32 |

TABLE I-continued

| | | | |
|---|---|---|---|
| 10 | 839(8) | 549(4) | −35 |

Coverage - Rubber coverage, 0=wire bare after being pulled from rubber; 10=wire completely covered with rubber after being pulled from the rubber.

The above data show the improved results obtained with the ammonium acetate treatment as compared to no treatment or other treatment including dipping in aqueous ammonia or aqueous acetic acid solution.

EXAMPLE II

The method of this example was the same as that of Example I above, except that the brass plated tire cord was Enka Type Z tire cord (7×4×0.20 mm brass-plated steel wire cord with 6±2 g brass/kg wire and with 67.5±3.5% by weight of copper in the brass), and the humidity aging was conducted for only 12 hours. The results obtained on testing are shown in Table II, below:

TABLE II

| Run No. | Age Of Treated Wire At Time Of Embedding In Rubber Compound | Treatment |
|---|---|---|
| 11 | Immediately after treatment | 1% $NH_4C_2H_3O_2/H_2O$, pH 7 |
| 11 A | " | 1% $NH_4C_2H_3O_2/H_2O$, pH 8 |
| 11 B | " | 1% $NH_4C_2H_3O_2/H_2O$, pH 9 |
| 11 C | " | 1% $NH_3/H_2O$, pH 11.2 |
| 11 D | " | No treatment (control) |
| 12 | One day | 1% $NH_4C_2H_3O_2/H_2O$, pH 7 |
| 12 A | " | 1% $NH_4C_2H_3O_2/H_2O$, pH 8 |
| 12 B | " | 1% $NH_4C_2H_3O_2/H_2O$, pH 9 |
| 12 C | " | 1% $NH_3/H_2O$, pH 11.2 |
| 12 D | " | No treatment |
| 13 | Two days | 1% $NH_4C_2H_3O_2/H_2O$, pH 7 |
| 13 A | " | 1% $NH_4C_2H_3O_2/H_2O$, pH 8 |
| 13 B | " | 1% $NH_4C_2H_3O_2/H_2O$, pH 9 |
| 13 C | " | 1% $NH_3/H_2O$, pH 11.2 |
| 13 " | do | No treatment |
| 14 | Three days | 1% $NH_4C_2H_3O_2/H_2O$, pH 7 |
| 14 A | " | 1% $NH_4C_2H_3O_2/H_2O$, pH 8 |
| 14 B | " | 1% $NH_4C_2H_3O_2/H_2O$, pH 9 |
| 14 C | " | 1% $NH_3/H_2O$, pH 11.2 |
| 14 D | " | No treatment |

| Run No. | Unaged Adhesion (N), (Coverage) | Humid Aged Adhesion (N), (Coverage) | % Adhesion Change |
|---|---|---|---|
| 11 | 834(7.5) | 707(7.5) | −15 |
| 11 A | 841(8) | 614(6) | −27 |
| 11 B | 868(8) | 732(7.5) | −16 |
| 11 C | 855(8) | 651(6.5) | −24 |
| 11 D | Not run | | |
| 12 | 831(7.5) | 709(8) | −15 |
| 12 A | 838(8.5) | 620(6.5) | −26 |
| 12 B | 840(8) | 719(7.5) | −14 |
| 12 C | 873(8) | 689(6.5) | −21 |
| 12 D | 763(7) | 319(0) | −58 |
| 13 | 808(7.5) | 751(8) | −7 |
| 13 A | 815(8) | 664(7) | −19 |
| 13 B | 821(7.5) | 694(7) | −16 |
| 13 C | 808(7.5) | 634(6) | −22 |
| 13 D | 752(7.5) | 323(0) | −57 |
| 14 | 808(7.5) | 719(7.5) | −11 |
| 14 A | 823(8) | 597(6) | −27 |
| 14 B | 798(7) | 720(7.5) | −10 |
| 14 C | 813(7.5) | 669(6) | −18 |
| 14 D | 716(7) | 315(0) | −56 |

The above data show that the ammonium acetate wash gives improved results as compared to an ammonia wash or no treatment. Also, the beneficial effects of the ammonium acetate dip are shown to be retained for at least three days. However, no definite trends in adhesion with change in pH were observed with this series of runs.

EXAMPLE III

A varian ESCA (Electron Spectroscopy for Chemical Analysis) instrument was used to evaluate the brass composition and composition profile on treated and untreated brass plated steel tire cords (wire). The treated cords had been cut and hand dipped for 48 seconds in 1% $NH_4C_2H_3O_2/H_2O$ (pH 7), water washed and dried at 105 degrees C. for 5 minutes. The wire was Enka Type Z (7×4×0.20 mm+1×0.15 mm, 6±2 g brass/kg of wire, 67.5%±3.5% Cu in the brass). The results obtained are shown in Table III, below:

TABLE III

| Wt. % Copper (Based on Cu+Zn)[1] | Untreated Cord | Treated Cord |
|---|---|---|
| As is | 37.5 | 70.6 |
| 10 sec. argon sputter | 35.3 | 69.5 |
| 640 sec. argon sputter | 64.4 | 65.3 |
| $N(Zn^o)^2$ $N((Zn^o+Zn^{++}))$ | | |
| As is | 0 | 0.25 |
| 10 sec. argon sputter | 0 | 0.33 |
| 640 sec. argon sputter | 0.37 | 0.34 |

[1] Estimated from areas of photoelectron peaks at 932 ev ($Cu2p3/2$) and 1021 ev ($Zn2p3/2$), corrected for elemental photoelectron signal intensity (H. Berthou and C. K. Jorgensen, Anal. Chem. 47, 482 (1975)). Not corrected for differences in sputtering rate of copper and zinc.
[2] Estimated from relative areas of Auger peaks at 262 ev ($Zn^o$) and 266 ev ($Zn^{++}$). N here equals number of Zn atoms or Zn atoms plus ions.

The results obtained show that the relative copper content near the surface of the brass has been increased by the treatment and that the relative amount of metallic zinc also has increased indicating the removal of some zinc oxide (or hydroxide). The reason for the improved behavior exhibited by the treated cord or wire may be due to the removal of oxides (probably principally zinc oxide) from the brass surface to provide a more bondable (and less water sensitive) layer for curing with the rubber.

Analysis of copper and zinc in the wash solution using atomic absorption showed that immersion in a one percent ammonium acetate aqueous solution for 48 seconds removes about 2.4 times as much zinc as copper with analyzed amounts corresponding to depths of 0.7 nm (nanometer) of $Cu_2O$ and 2.0 nm of ZnO on the brass surface. Drawing is believed to increase the zinc content on the surface of the brass plated steel wire.

EXAMPLE IV

The method of this example was similar to that of Example I, above, except that two types of brass coated steel tire wire cords were used, e.g., Enka Type B (7×4×0.20 mm plated with 6±2 g brass/kg wire, and 67.5±3.5% by weight of copper in the brass) and Enka Type Z (7×4×0.20 mm+1×0.15 mm with the same brass plating weight and composition). The results obtained are shown in Table IV, below:

TABLE IV

| Run No. | Cord Type | Treatment |
|---|---|---|
| 15 | Enka Type Z | 1% $NH_4C_2H_3O_2/H_2O$, pH 7 |
| 16 | Enka Type Z | 1% $NH_3/H_2O$ |
| 17 | Enka Type Z | None (Control) |
| 18 | Enka Type B | 1% $NH_4C_2H_3O_2/H_2O$, pH 7 |
| 19 | Enka Type B | 1% $NH_3/H_2O$ |
| 20 | Enka Type B | None |

| Run | Unaged Adhesion (N), | Humid Aged Adhesion (N), | % Adhesion |

TABLE IV-continued

| No. | (Coverage) | (Coverage) | Change |
|---|---|---|---|
| 15 | 901(8.5) | 802(8.5) | −11 |
| 16 | 902(9) | 731(5) | −19 |
| 17 | 815(8) | 524(3) | −36 |
| 18 | 871(7) | 284(2) | −67 |
| 19 | 885(7.5) | 189(1) | −79 |
| 20 | 910(9) | 121(0) | −87 |

A comparison of the effects of pretreating different wire types is shown by Table IV, above. The Enka B performance was improved by the ammonium acetate treatment, but the degree of improvement was much less striking because of the poor humid aging obtained with that wire type. ESCA results on the Enka B and Enka Z wires indicate much higher oxygen levels near the surface of the B wire than on the Z wire, perhaps explaining the low results obtained with the B wire. Also, this Enka Type Z cord contains a wrap wire which may give more mechanical bonding at times when a large proportion of the interfacial adhesion has been lost.

EXAMPLE V

The method of this example was similar to that of Example I, above, except that the brass plated steel wire tire cord was Bekaert (Bekaert Steel Wire Corp.) (7×4×0.20 mm with 6±2 g brass/kg of wire and 67.5%±3.5% by weight of copper in the brass) tire cord. The results obtained on testing the samples are shown in Table V, below:

TABLE V

| Run No. | Treatment | pH |
|---|---|---|
| 21 | 1% $NH_4C_2H_3O_2/H_2O$ | 5.0 |
| 22 | 1% $NH_4C_2H_3O_2/H_2O$ | 6.0 |
| 23 | 1% $NH_4C_2H_3O_2/H_2O$ | 7.02 |
| 24 | 1% $NH_4C_2H_3O_2/H_2O$ | 8.0 |
| 25 | 1% $NH_4C_2H_3O_2/H_2O$ | 9.0 |
| 26 | 1% $NH_4C_2H_3O_2/H_2O$ | 10.0 |
| 27 | 1% $NH_3/H_2O$ | 11.3 |
| 28 | No treatment (control) | |

| Run No. | Unaged Adhesion (N), (Coverage) | Humid Aged Adhesion (N), (Coverage) | % Adhesion Change |
|---|---|---|---|
| 21 | 645(6) | 332(2) | −29 |
| 22 | 485(2) | 425(5) | −12 |
| 23 | 619(4) | 487(7) | −21 |
| 24 | 856(7) | 534(7.5) | −38 |
| 25 | 757(7) | 514(7) | −32 |
| 26 | 907(8) | 524(7) | −42 |
| 27 | 798(7.5) | 415(5) | −48 |
| 28 | 903(8.5) | 453(6.5) | −50 |

While the data in Table V show improvement in % adhesion change, the unaged and humid aged adhesions in some cases are not as high as the control. Also, note the difference when using the Enka Type Z wire of Table I, above, which however has a different construction.

EXAMPLE VI

The method of this example was similar to that of Example I, above, except as noted. The results obtained are shown in Table VI, below:

TABLE VI

| Run No. | Brass Plated Steel Cord Used | Ammonium Acetate (1) treated |
|---|---|---|
| 29 | Sodetal (2) | No (Control) |
| 30 | Sodetal | Yes |
| 31 | Trefil Arbed (FAN) (2) | No (Control) |
| 32 | Trefil Arbed (FAN) | Yes |

| Run No. | Unaged Adhesion (N), (Coverage) | Humid Aged Adhesion (N), (Coverage) | % Adhesion Change |
|---|---|---|---|
| 29 | 804(7.5) | 594(6.5) | −26 |
| 30 | 850(7.5) | 603(6) | −29 |
| 31 | 778(7) | 346(3) | −56 |
| 32 | 765(6.5) | 409(4.5) | −47 |

(1) 1% $NH_4C_2H_3O_2/H_2O$, pH 8
(2) 7 × 4 × 0.20 mm, 6 ± 2g brass/kg of wire, 67.5% ± 3.5% Cu in the brass

EXAMPLE VII

The method of this example was similar to that of Example I, above. Enka Type Z (7×4×0.20 mm, 6±2 g brass/kg of wire, 67.5%±3.5% Cu in the brass) brass plated steel wire tire cord was used. In the rubber compound of this example 3.75 parts of "Crystex" (80% sulfur in mineral oil, Stauffer Chem.) was used in place of 3 parts of Rubbermaker's Sulfur. The concentrations of the ammonium acetate salt in water in the dipping unit were 1% and 2% by weight, and the times of dipping varied. Also, some runs were not followed by a water rinse. The results obtained are shown in Table VII, below:

TABLE VII

| Run No. | Salt Conc., % | Dip Time Sec. | Water Rinse |
|---|---|---|---|
| 33 | 1 | 12 | No |
| 34 | 2 | 12 | No |
| 35 | 1 | 48 | No |
| 36 | 2 | 48 | No |
| 37 | 1 | 12 | Yes |
| 38 | 2 | 12 | Yes |
| 39 | 1 | 48 | Yes |
| 40 | 2 | 48 | Yes |
| 41 | None, Control | — | — |

| Run No. | Unaged Adhesion (N), (Coverage) | Humid Aged Adhesion (N), (Coverage) | % Adhesion Change |
|---|---|---|---|
| 33 | 778(7) | 423(3) | −46 |
| 34 | 782(7) | 527(5) | −33 |
| 35 | 760(7) | 459(4) | −40 |
| 36 | 769(7) | 645(6) | −16 |
| 37 | 786(7) | 388(2) | −51 |
| 38 | 843(7) | 488(3.5) | −42 |
| 39 | 778(7) | 399(2.5) | −49 |
| 40 | 813(7) | 569(6) | −30 |
| 41 | 753(7) | 273(0) | −64 |

EXAMPLE VIII

The method of this example was similar to that of Example I, above. Enka Type Z (7×4×0.20 mm, 6±2 g brass/kg of wire, 67.5±3.5% Cu in the brass) brass plated steel wire tire cord was used. The concentrations of the ammonium acetate salt in the water in the dipping unit were 1% and 2% by weight, and the times of dipping varied. Also, the times of the subsequent water rinses varied. Moreover, cured samples, also, were heat aged before being given the adhesion test. The heat aging treatment is the same as the humid aging treatment except that there was not any water in the cylinders. The results obtained on testing are shown in Table VIII, below:

TABLE VIII

| Run No. | Salt Conc., % | Dip Time, Sec. | H₂O Rinse Time, Sec. |
|---|---|---|---|
| 42 | 1 | 12 | 10 |
| 43 | 2 | 12 | 10 |
| 44 | 1 | 48 | 10 |
| 45 | 2 | 48 | 10 |
| 46 | 1 | 12 | 40 |
| 47 | 2 | 12 | 40 |
| 48 | 1 | 48 | 40 |
| 49 | 2 | 48 | 40 |
| 50 | None, Control | | |

| Run No. | Unaged Adhesion (N), (Coverage) | Heat Aged Adhesion (N), (Coverage) | Humid Aged Adhesion (N), (Coverage) |
|---|---|---|---|
| 42 | 789(7) | 669(7) | 644(6.5) |
| 43 | 765(7) | 740(7.5) | 734(7.5) |
| 44 | 776(7) | 679(7) | 691(7) |
| 45 | 707(6.5) | 729(7.5) | 720(7.5) |
| 46 | 833(8) | 714(8) | 672(6.5) |
| 47 | 802(7.5) | 781(8) | 728(7.5) |
| 48 | 798(7) | 675(7) | 721(8) |
| 49 | 747(6.5) | 789(7.5) | 754(7.5) |
| 50 | 794(8.5) | 674(7.5) | 487(2) |

| Run No. | % Adhesion Change Heat Aged | % Adhesion Change Humid Aged |
|---|---|---|
| 42 | −15 | −18 |
| 43 | −3 | −4 |
| 44 | −12 | −11 |
| 45 | +3 | +2 |
| 46 | −14 | −19 |
| 47 | −3 | −9 |
| 48 | −15 | −10 |
| 49 | +6 | +1 |
| 50 | −15 | −39 |

EXAMPLE IX

The method of this Example was similar to that of Example I, above. The wires used were Enka Type Z and Bekaert (both 7×4×0.20 mm, 6±2 g brass/kg of wire, 67.5%±3.5% Cu in the brass) brass plated steel cords. The dipping or treatment solution was a 2% aqueous ammonium acetate solution. After dipping (treating), rinsing and drying, the wires were stored over a desiccant for 10 months before being compounded or combined with the rubber, cured and tested. Untreated wires were likewise stored over a desiccant for the same time before being combined with the rubber, cured and tested, and the results obtained are shown in Table IX, below:

TABLE IX

| Run No. | Wire | Unaged Adhesion (N), (Coverage) | Humid Aged Adhesion (N), (Coverage) | % Adhesion Change |
|---|---|---|---|---|
| 51 | Enka Z, untreated | 730 (7) | 364 (2) | −50 |
| 52 | Enka Z, treated | 800 (8) | 656 (8) | −18 |
| 53 | Bekaert, untreated | 806 (5) | 368 (5) | −54 |
| 54 | Bekaert, treated | 842 (6.5) | 451 (7) | −47 |

EXAMPLE X

The method of this Example was similar to that of Example I, above, except as noted herein. The brass plated steel wire cord used was Enka Z (7×4×0.20 mm, 6±2 g brass/kg of wire, 67.5%±3.5% Cu in the brass). Various aqueous acetic acid salt solutions such as aqueous ammonium acetate, sodium acetate, and so forth were used, and the amounts were chosen so as to give about equivalent amounts of acetate ions. The rubber compound used in the test contained the following ingredients:

| Ingredient | Parts by Weight |
|---|---|
| Natural Rubber | 100 |
| HAF Carbon Black | 50 |
| "Hi-Sil" 215 (precipitated hydrated silica, PPG Industries) | 10 |
| Aromatic processing oil ("Philrich" No. 5, Phillips Petroleum Co.) | 8 |
| Zinc oxide | 6 |
| "Cohedur" RL | 5.2 |
| Sulfur (Rubbermakers Grade) | 4.5 |
| N-1,3 Dimethylbutyl N'-Phenyl-p-phenylene diamine ("Wingstay" 300, Goodyear Tire & Rubber Co., Chemical Div.) | 2 |
| Cobalt borate neodecanoate ("Manobond" C-16, Wyrough and Loser, Inc.) | 1.1 |
| "Vulkacit" DZ | 1.1 |
| Stearic acid | 1 |

The results obtained on testing the cords are shown in Table X, below.

TABLE X

| Run No. | Treatment Concentration and type of salt in aqueous dip | Unaged Adhesion (N), (Coverage) |
|---|---|---|
| 55 | 1% NH₄C₂H₃O₂, pH 7.1 | 1045 (7.5) |
| 56 | None - Control | 1059 (8.0) |
| 57 | 1.06% Na C₂H₃O₂, pH 7.7 | 1090 (8.0) |
| 58 | None - Control | 1072 (8.0) |
| 59 | 1.27% K C₂H₃O₂, pH 6.9 | 1085 (7.5) |
| 60 | None - Control | 1094 (8.0) |
| 61 | 1.39% Mg (C₂H₃O₂)₂ . 4H₂O, ph 7.6 | 1094 (8.0) |
| 62 | None - Control | 1103 (7.5) |
| 63 | 1.42% Zn(C₂H₃O₂)₂ . 2H₂O, pH 6.2 | 1050 (8.5) |
| 64 | None - Control | 1055 (7.5) |
| 65 | 1.14% Ca(C₂H₃O₂)₂ . H₂O, pH 7.0 | 1005 (7.5) |
| 66 | None - Control | 1076 (8.0) |

| Run No. | Humid Aged Adhesion (N), (Coverage) | % Adhesion Change |
|---|---|---|
| 55 | 925 (4) | −12 |
| 56 | 672 (2) | −37 |
| 57 | 676 (2) | −38 |
| 58 | 698 (2) | −35 |
| 59 | 774 (5) | −29 |
| 60 | 707 (2) | −35 |
| 61 | 765 (2) | −30 |
| 62 | 698 (2) | −37 |
| 63 | 747 (3) | −29 |
| 64 | 685 (2) | −35 |
| 65 | 836 (4) | −17 |
| 66 | 694 (2) | −36 |

I claim:

1. The method which comprises dipping brass plated steel cord in an aqueous solution consisting essentially of from about 0.5 to 6.0 percent by weight of at least one salt selected from the group consisting of the NH₄, Na, K, Li, Ca, Mg, Sr, Ba and Zn salts of a saturated aliphatic monocarboxylic acid selected from the group consisting of formic, acetic, propionic, n-butyric, isobutyric, valeric and isovaleric acids and mixtures thereof for a time and at a temperature sufficient to remove at least a substantial amount of the corrosion products on the outer surface layers of said cord and then drying the same.

2. The method according to claim 1 containing the additional step of washing said solution treated cord in water to remove residual amounts of said solution from said cord prior to drying the same.

3. The method according to claim 2 where said aqueous solution has a pH of from about 7 to 10.

4. The method according to claim 3 where said salt is ammonium acetate.

5. The method according to claim 1 containing the additional step of combining said dried cord with a vulcanizable rubber compound and vulcanizing the same.

6. The method according to claim 2 containing the additional step of combining said dried cord with a vulcanizable rubber compound and vulcanizing the same.

7. The method according to claim 3 containing the additional step of combining said dried cord with a vulcanizable rubber compound and vulcanizing the same.

8. The method according to claim 4 containing the additional step of combining said dried cord with a vulcanizable rubber compound and vulcanizing the same.

* * * * *